United States Patent [19]
Pohl et al.

[11] 3,825,126
[45] July 23, 1974

[54] FLOWER POT GRATE-TRAY
[75] Inventors: Siegfried Pohl, Niederkassel-Rheidt; Günther Nöthen, Provinzialstr. 98, Niederkassel-Mondorf, both of Germany
[73] Assignee: said Nothen, by said Pohl
[22] Filed: Mar. 15, 1972
[21] Appl. No.: 234,720

[30] Foreign Application Priority Data
Mar. 19, 1971 Germany.......................... 2113499

[52] U.S. Cl...................... 211/71, 47/34.11, 206/72
[51] Int. Cl............................................. A47g 7/02
[58] Field of Search............ 211/71, 72, 74, 73, 75, 211/77; 206/72; 224/48; 47/34.11

[56] References Cited
UNITED STATES PATENTS

| 647,388 | 4/1900 | Evans | 206/72 UX |
| 1,370,811 | 3/1921 | Harding | 224/48 A |
| 1,643,735 | 9/1927 | Baker | 224/48.2 |
| 1,659,344 | 2/1928 | Wissman | 224/48 A UX |
| 2,462,956 | 3/1949 | Gross | 211/71 X |
| 3,542,210 | 11/1970 | Sorensen | 211/13 X |
| 3,638,849 | 2/1972 | Goings | 211/73 X |

FOREIGN PATENTS OR APPLICATIONS
940,687 12/1948 France............................. 211/126

Primary Examiner—Roy D. Frazier
Assistant Examiner—Thomas J. Holko
Attorney, Agent, or Firm—P. D. Golrick

[57] ABSTRACT

A symmetrical grate-like flower pot pallet or tray molded from impact resistant plastic providing rows and columns of equi-spaced downwardly convergent pot-receiving rings connected to each other and to hand-grip end bars by paired parallel struts; support legs shaped and externally vertically channelled to receive and be received by legs of like trays for nesting when empty; the end bars and strut-like end-joined paired lateral projections on the rings along the other two sides affording abutments for adjacent trays maintaining an ordered arrangement in a horizontal tray array.

3 Claims, 3 Drawing Figures

FLOWER POT GRATE-TRAY

In the effort to make the single work operations even in the horticultural industry essentially more economical and rational, there has already been developed a flower pot handling receptacle.

For establishments where a so-called potting machine is used to fill the pots with soil and ready them for the transplanting of say young plants, such receptacles recently have been employed to receive the pots loaded therein subsequent to the filling operation.

After the young plants have been emplaced in the machine-prepared pots arrayed in the loaded receptacles, the receptacles are transported to the forcing house, where with the planted flower pots therein, they are placed in the appropriate beds or on suitable so-called cultivating tables. A particular tray-type receptacle design has the advantages that the pots do not have to be removed therefrom during the time when they are kept in the forcing house and that without any difficulty whatsoever the plants can be given necessary care, as for example watering, fertilizing and so forth. After the plants have grown for a certain time, the completely loaded receptacle is removed from the bed and brought to its next place of use, where usually the grown plants are for the first time removed from the receptacle.

Inasmuch as it is necessary for the plants to receive a regular supply of moisture, water, fertilizer, and so forth as is well known, the receptacle, as preferably made from impact resistant polystyrene, is also especially suited for emplacement in beds and the like.

Meanwhile also there has been developed a process and a machine which enables pots to be mechanically loaded into receptacles of the above mentioned type, with a particular advantage for the overall production, which comprises in essence carrying out the filling and the further handling operations simultaneously on pots maintained at all times disposed next to one another in plural rows in each of a succession of pot receptacles as above described. Prior thereto potting machines had been known by which however only one pot at a time was filled and prepared for the later implanting of cuttings or transplating of seedling plants.

However, the further work of the inventors, with the aforementioned design for receptacles, has shown that it indeed has satisfactorily fulfilled the requirements made of it, but that pricewise it would be burdensome for horticultural businesses, which indeed under some conditions require hundreds of these trays in order to suitably convert the entire work system for the advantages of their use.

Now the present invention represents a further improved receptacle or pot tray which is directed to overcoming the financial burden entailed by prior receptacles and yet which can be substituted for the same purpose and with like success. Moreover, with a reasonably expected favorable price, it is anticipated that the receptacles themselves with their contents can be sold on the mass market; and accordingly the handling of the individual flower pots, usually necessary in plant merchandizing, will not in fact be necessary, by which advantageously the receptacle's flexible character and universal applicability are expanded.

By the present invention, a flower pot receptacle provided for the described purposes is comprised of rows and columns of equi-spaced downwardly convergent conical rings, affording pot-receiving apertures and joined by short paired struts into a grate-like tray; and has downwardly extending leg structures serving as supporting feet and also adapted in shape to permit stable ordered stacking of empty receptacles. Strut pairs projecting from each respective ring, on the long tray sides in each pair are end-connected by a respective short bar, and on each narrow side are all connected by a long hand grip forming bar; with the bars further forming abutments for adjacent trays, permitting trays to be arranged in an orderly horizontally extended tight array. This structure, of which further particular details will be explained in a particular embodiment, is adaptable to integral one-piece molding from suitable plastics such as polystyrene, with a minimal plastic content for the size and function achieved with the consequent advantages in low cost and light weight; and further permits ready loading and suitable guiding in a potting machine, and also easy handling both of the tray, empty or loaded, and of the pots received therein.

It is the general object of the present invention to provide a low cost, rugged flower pot receiving receptacle of pallet or tray-like form and function. Another object is to provide a pot tray adapted to molding from high impact strength plastic in a single piece light in weight and handled easily in potting machines as well as manually. Another object is to provide a pot receptacle of the character described adapted to compact stable stacked storage when empty, and also easily arranged in a compact ordered horizontal array of many like receptacles in use in horticultural operations.

Other objects and advantages will appear from the following description and drawings wherein.

Figure 1:
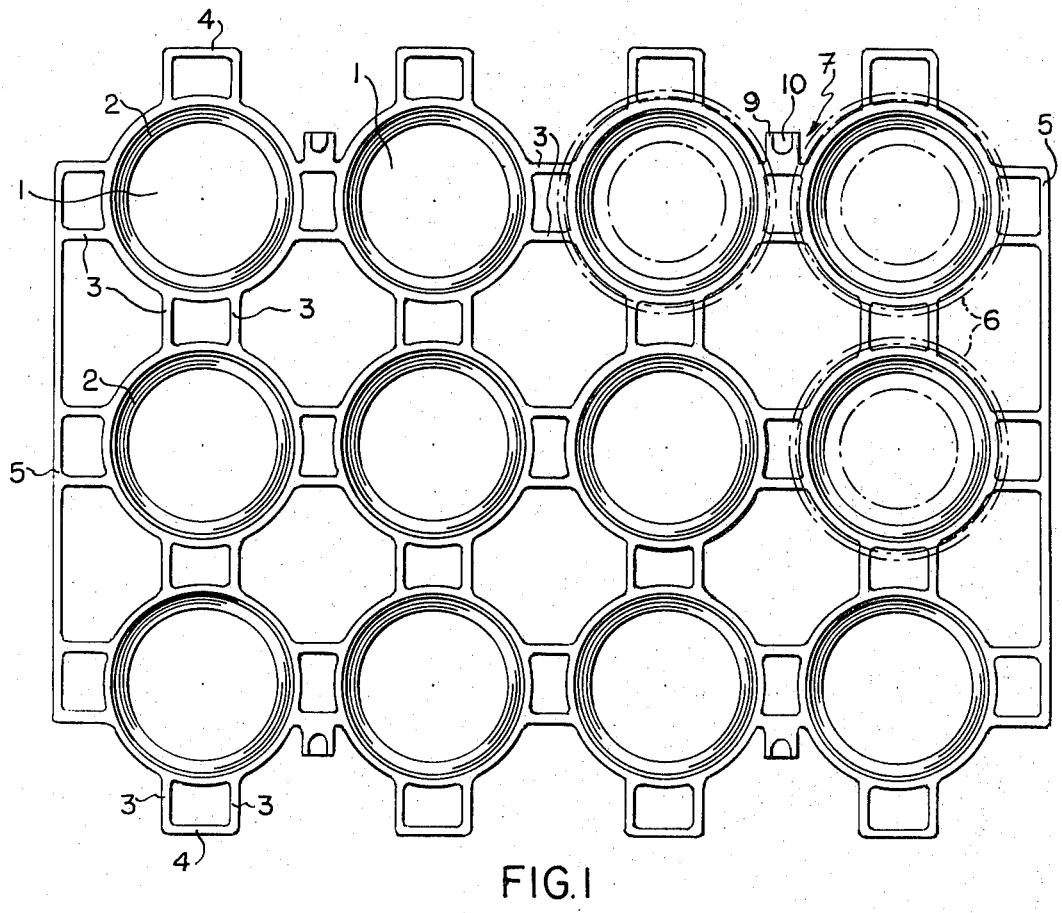
FIG. 1 is a plan view of a flower pot receiving receptacle as one embodiment of the invention.

In the embodiment presented in the drawings, there is shown a symmetrical flower pot receptacle for the described purposes having a twelve pot capacity, in which the various parts of an integral structure hereinafter described will be provided with appropriate drafts in accordance with standard production design considerations for one-piece manufacture by plastic molding, e.g., of an appropriately selected high impact resistant polystyrene, which is enabled by the invention. Hence in the following description where material or part sections are described by a convenient geometrical term, e.g., as oblong, it is to be understood that divergencies from the literal meaning of the geometric term are contemplated as might be required from mold draft considerations.

Twelve pot receiving spaces 1 or open bottom sockets are provided through a three-row, four-column equi-spaced arrrangment of like truncated inverted conical bands or rings 2, from the upper regions of each of which struts 3 project outwardly in pairs centered on 90° successive spacings, to connect the rings to each other, and to lateral abutment bars 4 and 5, in an integral grate-like structure including foot and stacking support leg elements 7.

The top edges of the rings 2, of the narrow strut 3, and of bars 4 and 5 lie in common plane representing the tray top, from which plane the struts 3, bars 4 and 5, all shown as having a narrow oblong vertical cross-section, extend downwardly about half of the height of the rings 2; and from which the rings taper or converge downwardly, that is have inside diameters decreasing as do the outside diameters of pots. Here the sections of the band-like rings 2, struts 3 and bars 4, 5 are shown as having about the same thickness but obviously may be varied from this.

Along each long side of the tray, the ends of the outwardly projecting spaced parallel struts 3 of each pair are joined by the short bars 4, providing abutment faces lying in a common vertical plane defining the effective side of the tray, and along each short side or tray end, the ends of the strut pairs are similarly joined by the long bar 5 spanning all pairs to provide tray carrying grips as well as to define vertical end abutment faces perpendicular to the common vertical planes of the sides and spaced above the tray-supporting surface, so that the like trays may be disposed abutting in an ordered horizontal close array, as on a table in a green house. Such abutment faces also afford guide surfaces for passing through a potting machine. Thus the effective or gross plan outline of the tray is generally rectangular, though indeed the short connecting bars are not continued as a single side bar on the longer tray sides.

The four integral vertically elongated foot and stacking support formations or legs 7 in the tray structure are shown as integrally molded at either side of tray mid-length on an outer strut 3 between the respective ring pairs along each long side of the tray. Each formation 7 comprises a lower part 8 of half-round section providing a foot proper as an elongation of an upper part 9 having a square cross-section extending from the tray top plane downwardly below the strut face of its integral attachment to a level below a common bottom plane of the rings 2. A vertical outer face recess 10 in the upper part 9 is shaped to accommodate a foot portion 8 of like tray stacked therein, with the shouldered bottom of the upper part 9 in the superior tray resting on the top of the like part in the lower tray.

Figure 3:
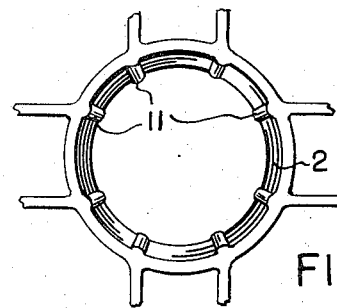
FIG. 3 is a fragmentary plan view of a pot-receiving formation showing an advantageous further option in structure.

Also as indicated in fragmentary FIG. 3, the sloping interior surface of each ring 2 may have a plurality of circumferentially spaced and preferably paired integral downward ribs 11, used to give limited bearing contact with a pot to prevent pot sticking and thus facilitate removal.

Figure 2:
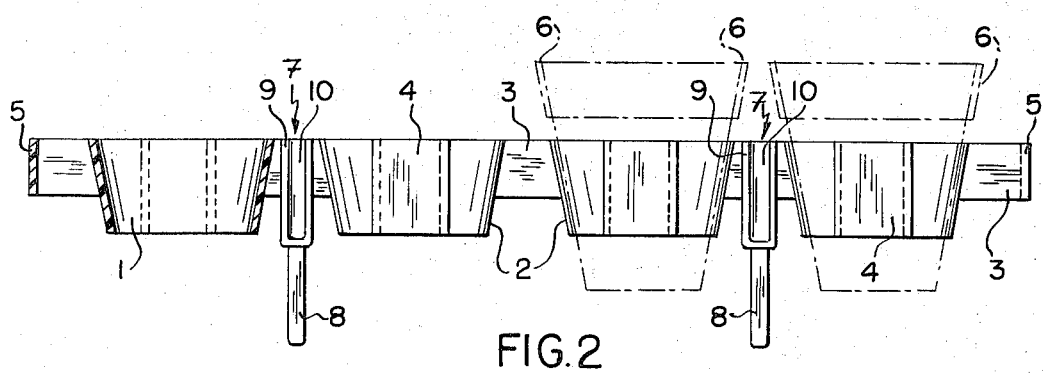
FIG. 2 is a side view corresponding to FIG. 1, but on a slightly larger scale and having a certain portion broken away for clarity of representation.

With the tray structure as shown, the downward foot parts 8, by engagement of feet of superior trays in recesses 10 of lower trays, interlock stacked trays in a stable stack of considerable height; as well as serving when a tray is in use loaded with pots, to provide support feet providing bottom clearance for a pot (as indicated by the dashed outline at 6 in FIG. 2) relative to a table or other tray support surface.

The described placement of the leg formations 7 (between the outer pairs of open bottomed pot accepting sockets or rings 2 at each half of the tray length) places the points of support or reaction force application at points inward of the ends of the beam in effect formed by the four rings and aligned intervening connecting struts 3, to better distribute the pot loading and applied forces among the intervening struts. With larger heavier pots the upper rims of the pots will be closer (see dotted outlines 6 in FIG. 1) and, with load flexing of the tray, come into deflection-limiting contact especially between adjacent pots in transverse columns or at the middle of the tray at times in the rows, again distributing overall loading stresses; an advantage additional to general space-saving arising from the close meshed spacing of the rings.

By way of example, it is noted that with each conical ring 2 having a height of 20 mm and average diameter of about 90.6 mm, the tray will readily accommodate five of the plastic pots and two of the clay flower pots most widely used at present, at least in Europe.

The connection of the rings 2 to each other in close spacing and to the abutment elements 4 and 5 by the paired struts affords a tray structure which saves space on or in green house tables and beds and in stable stacking for storage or magazine feed to a machine; which is easily handled manually both in hand carrying and in orderly arranging in extended horizontal arrays, and also guided in passing through a machine; which also by the open grating formation allows soil overflowing pots in machine filling operations to fall through the tray; and which for strength attained minimizes the plastic material required in each tray. Hence with modern plastics and molding techniques a pot handling receptacle in accordance with the present invention is adapted to low cost manufacture while meeting the practical demands imposed thereon.

We claim:

1. For the reception of upright flower pots in horticultural operations, a pallet-like tray of generally rectangular gross plan outline molded from an impact-resistant plastic as an integral one-piece structure and comprising:

an array of horizontally distributed and spaced pot-receiving like rings, said rings having each a downwardly convergent truncated conical form, and being closely connected, by pairs of struts extending in one direction parallel to the tray length, into columns, and by pairs of parallel struts extending in a direction at right angles to the first said direction, into rows, and thus presenting pot-receiving openings in a grate-like tray form generally open externally of the rings, each said strut having a vertically elongated transverse cross section, each ring having paired struts attached thereto in four pairs with the pairs spaced circumferentially thereon by 90° thereby to provide parallel paired connections between adjacent rings and also laterally projecting strut pairs on the sides of the tray, the laterally projecting strut pairs along two opposed sides of the tray each having the paired struts connected integrally with one another within each pair at their outer ends by respective bars having abutment faces coplanar on the respective sides of the tray and spaced upwardly from a tray-supporting surface; on each of the other two opposed sides of the tray the ends of all of the projecting strut pairs being integrally end-connected by a respective common bar forming a carrying grip and guide bar spaced upwardly from a tray-supporting surface; whereby placement of like trays in paralllel like-oriented abutting relationship for a close-packed horizontal arrangement of trays is facilitated and achieved by abutting bar elements spaced above a tray-supporting surface, and two foot and stacking leg formations providing tray-supporting feet associated with the outer column along each of two opposite sides of the tray, said formations being located within the rectangular plan outline of the tray, and each disposed at about the middle of a respective half of the tray side and dependent from connecting struts between adjacent rings,
whereby the array of rings is spaced from a tray supporting surface.

2. A tray as described in claim 1, wherein:
each pot-receiving ring is formed with at least one downwardly running internal rib to facilitate pot removal.

3. A tray as described in claim 1, wherein:
each said leg formation on its upper half has a rectangular cross-section outline interrupted on its outer face by a vertical half-round recess; and
on its lower half has an extension of half-round section adapted to fit in the leg formation recess of the upper half of another like tray, thereby to provide stacking interlock means.

* * * * *